Figure 1:
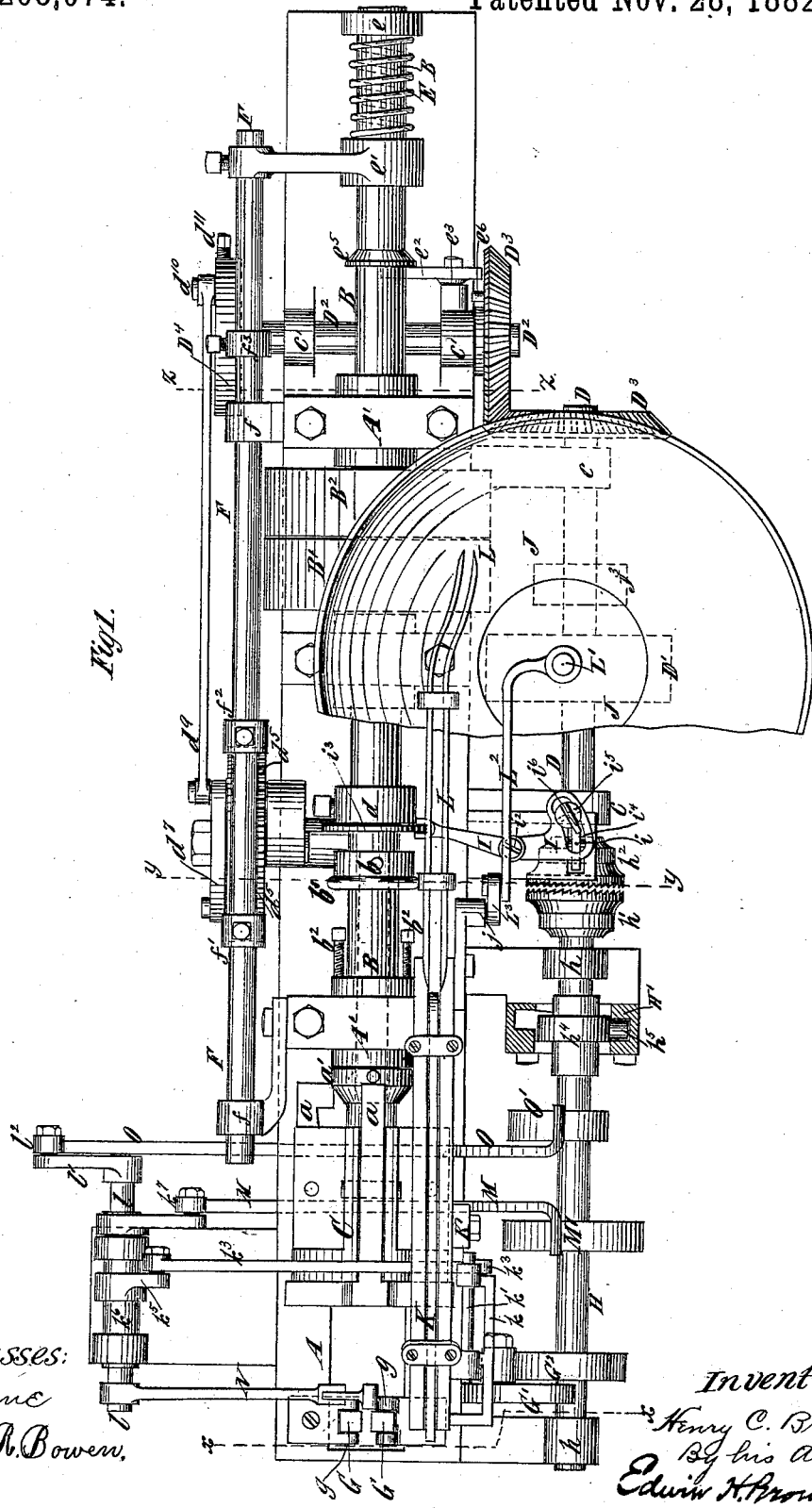

(No Model.)

3 Sheets—Sheet 1.

H. C. BRILL.
MACHINE FOR THREADING BOLTS.

No. 268,074.

Patented Nov. 28, 1882.

Witnesses:
T. J. Keane
James R. Bowen.

Inventor:
Henry C. Brill
By his Atty,
Edwin H. Brown.

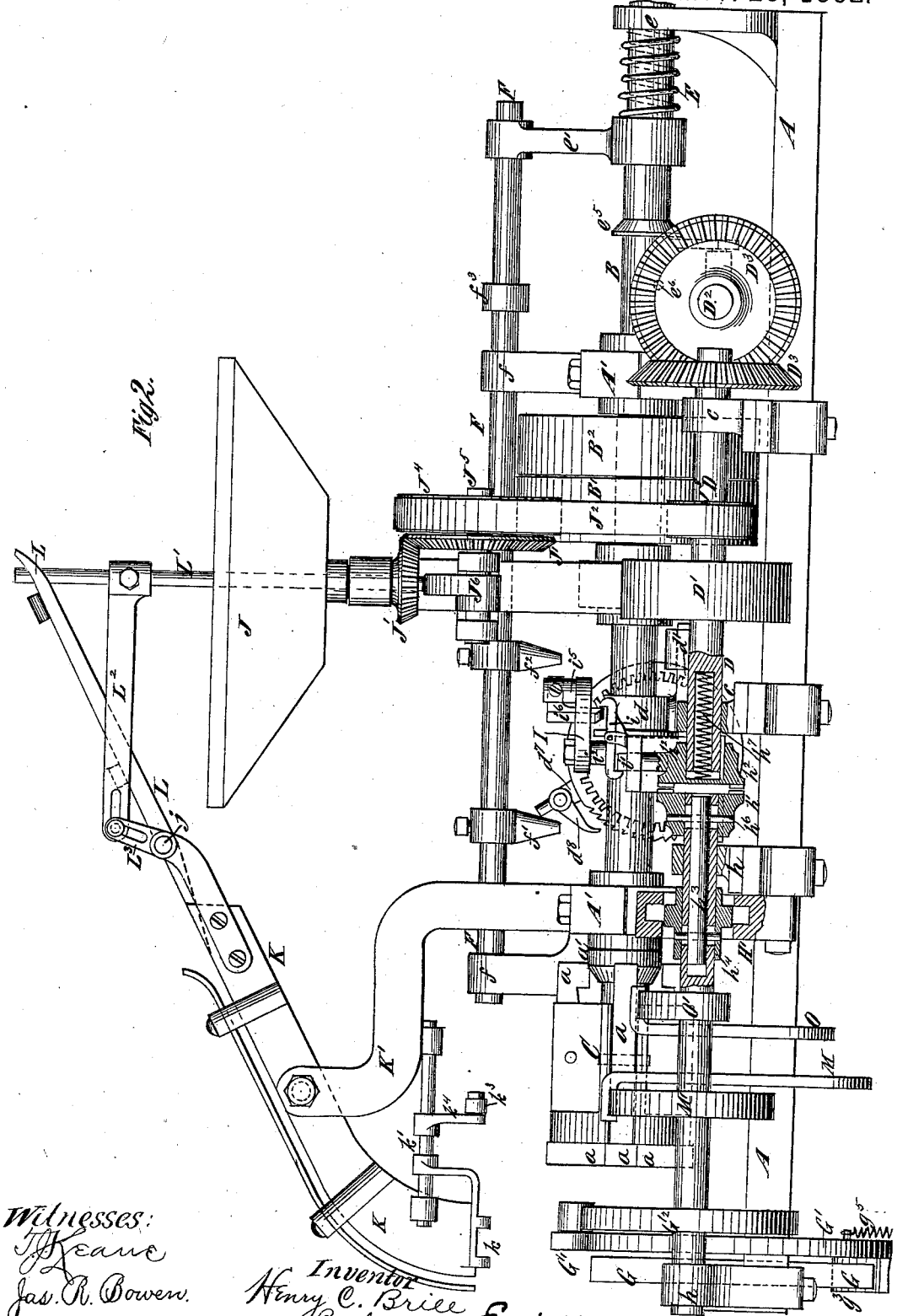

(No Model.) 3 Sheets—Sheet 3.
H. C. BRILL.
MACHINE FOR THREADING BOLTS.
No. 268,074. Patented Nov. 28, 1882.
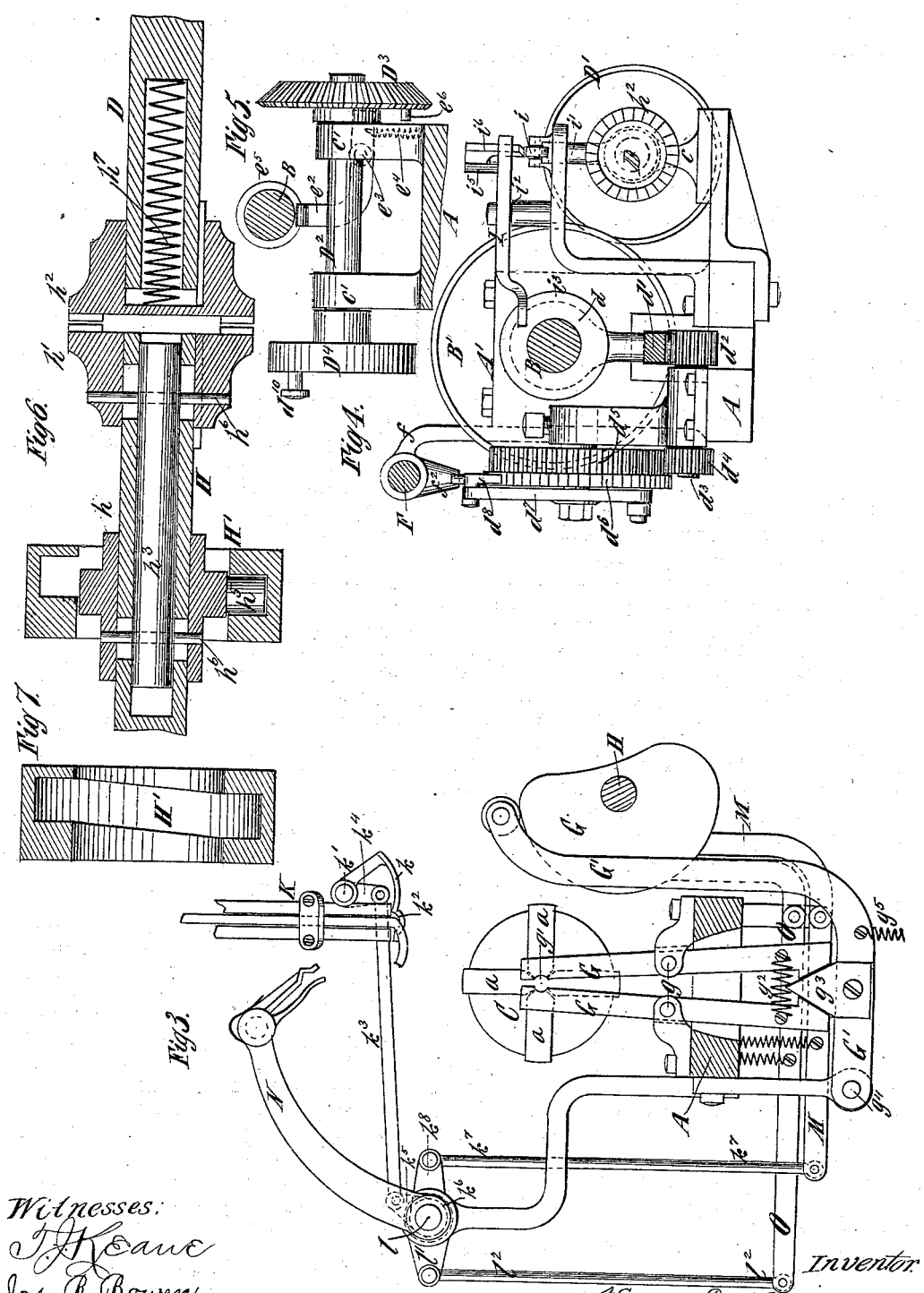

UNITED STATES PATENT OFFICE.

HENRY C. BRILL, OF SOUTHINGTON, CONNECTICUT, ASSIGNOR ONE-HALF TO ROSWELL A. NEAL, OF SAME PLACE.

MACHINE FOR THREADING BOLTS.

SPECIFICATION forming part of Letters Patent No. 268,074, dated November 28, 1882.

Application filed August 9, 1881. (No model.)

*To all whom it may concern:*

Be it known that I, HENRY C. BRILL, of Southington, in the county of Hartford and State of Connecticut, have invented certain new and useful Improvements in Machines for Threading Bolts, of which the following is a specification.

The general object of my invention is to provide a machine for threading bolts which shall be entirely automatic in its action, taking the bolts from a hopper in which they are placed by hand, and which shall require no attention except to see that the supply in the hopper is not exhausted, thus making it possible for one workman to run a number of machines.

In my improved machine the bolts are placed by a feeding device between clamps or clamping or holding jaws, which grasp them and hold them stationary while the rotary spindle carrying the die is advanced, permitting the die to cut the thread, after which the spindle is drawn back and the said clamping or holding jaws are opened to release the threaded bolt.

In my machine, as in some other threading-machines, the spindle carrying the threaded die is rotated continuously in one direction, and the sectional die, after cutting a thread of the required length upon the bolt, is opened and the spindle is drawn back. If any bolt be slightly smaller in diameter, as is often the case, it will not be properly held in the clamping-jaws, but will turn, thus retarding the operation of threading it; and if the mechanism for operating the clamping-jaws were such as to open them at regular intervals, they would be opened before the threading of the bolt was completed, and the several parts of the machine would be thrown out of time, thus destroying the proper successive operations and entailing damage to the machine.

The particular object of my invention is to place the clamping-jaws, and also the device which feeds the bolt-blanks to them, under the control of the die-carrying spindle, so that the said jaws cannot open or the feeding device be operated until the die is released from the bolt and the spindle commences its backward movement.

To this end my invention consists in a bolt-threading machine comprising the combination of a die-carrying spindle adapted to rotate continuously in one direction, and having a quick backward movement, a sectional threading-die carried by said spindle, means for opening said die after it has performed its work, clamping or holding jaws for bolt-blanks, an intermittingly-rotating cam-shaft for operating said jaws, a continuously-rotating shaft, and a clutch or device which is adapted to be operated by the backward movement of the spindle to connect said shafts, and thereby effect the opening of the clamping or holding jaws and the release of the threaded bolt. I also combine the above-mentioned feeder or feeding device with the intermittingly-rotating cam-shaft, so that it also will be operated thereby, as hereinafter described and claimed.

The invention also consists in the combination, in a machine for threading bolts, of a die-carrying spindle, a spring for imparting a forward movement to said spindle, mechanism for imparting a backward movement to said spindle, and a catch whereby said spindle is held in its backward position against the force of said spring.

The invention also consists in details of construction to be hereinafter described.

In the accompanying drawings, Figure 1 represents a plan of a machine embodying my invention, with certain parts removed. Fig. 2 represents a partly-sectional side view of said machine. Fig. 3 represents a transverse section upon the dotted line *x x*, Fig. 1. Fig. 4 represents a similar section on the dotted line *y y*, Fig. 1. Fig. 5 represents a similar section on the dotted line *z z*, Fig. 1. Fig. 6 represents a detail sectional view of certain parts upon a larger scale, and Fig. 7 represents a detail sectional view upon the same scale as Fig. 6.

Similar letters of reference designate corresponding parts in all the figures.

A designates the bed of the machine, and B the main spindle, arranged in suitable bearings, A', and adapted to be rotated continuously in one direction by a belt passing over fast and loose pulleys B' B². Upon the forward end the spindle B carries a die-head, C, in which are pivoted jaws $a$, forming a sectional die of well-known construction. The jaws $a$ are closed to cut a thread by a taper collar, $a'$, upon the spindle passing under their rear ends, and are expanded in the manner hereinafter described. Upon the spindle B, in rear of the forward bearing, A', is a collar, $b$, and both the collars $a'$ and $b$ are pinned to a central rod, which is arranged to slide within the spindle, and is impelled forward by a spring, also within the spindle. When the spindle B is drawn back the collar $a'$ strikes against the forward bearing, A', and is held while the spindle and die-head C continue their movement, thus forcing the rear ends of the jaws $a$ over the collar $a'$, as seen in Fig. 1, and contracting the forward ends of said jaws. When the spindle B is moved forward the die cuts a thread until the collar $b$ or a loose washer, $b'$, in front of said collar strikes against adjustable stops $b^2$, composed of set-screws inserted into the forward bearing, A', whereupon the collar $a'$ is withdrawn from under the jaws $a$ sufficiently to cause the said jaws to bear upon the inclined surface of the collar. The springs which open the jaws $a$ then force the collar $a'$ back, and thus allow the jaws to open to release the bolt. The inner rod, to which the collars $a'$ and $b$ are connected is only shown in Fig. 1 in dotted outline; but the mechanism above described is commonly used in threading-machines having sectional dies, and no further illustration thereof is thought necessary.

D designates a shaft, mounted in bearings $e$, and adapted to be rotated by a belt upon a pulley, D'; and D² designates a counter-shaft, arranged in bearings $c'$ transversely to the shaft D and spindle B, and receiving motion through bevel-wheels D³ from the shaft D. Upon the spindle B is a fixed collar, $d$, which has rigidly secured upon its under side a rack, $d'$, (shown in Fig. 4,) and a backward motion is imparted to said rack, and through it to the spindle B, by means of a pinion, $d^2$, upon a short shaft, $d^3$, as also seen in Fig. 4. The shaft $d^3$ also carries a pinion, $d^4$, which gears into a spur-wheel, $d^5$, having a ratchet-toothed flange, $d^6$, and upon the shaft or stud of the wheel $d^6$ is an oscillating lever, $d^7$, carrying a pawl, $d^8$, for imparting motion to the wheel $d^5$ and through the intermediate mechanism a backward movement to the spindle B. Upon the counter-shaft D² is a crank, D⁴, which transmits motion through a rod, $d^9$, to the oscillating lever $d^7$; and the crank-pin $d^{10}$ of the crank D⁴ may be adjusted toward and from the center by means of a set-screw, $d^{11}$, (see Fig. 1,) to alter the throw of the crank. From the above description it will be clearly understood how the spindle B is moved backward.

The spindle B is moved forward by means of a spring, E, arranged upon it between a fixed bearing, $e$, and an arm, $e'$, secured on the spindle, for a purpose hereinafter described; and after being moved backward the spindle is held against forward movement until the proper time by means of a catch or latch, $e^2$, consisting of a bent lever pivoted at $e^3$, and actuated by a spring, $e^4$, to hold it in engagement with a collar, $e^5$, on the spindle, as best seen in Figs. 1 and 5. The collar $e^5$ and the point of the catch or latch $e^2$ are both tapered or inclined so that the collar may move backward over the catch or latch, which then springs up and holds it. In order to trip the catch or latch $e^2$ and allow the spring E to throw the spindle forward, a pin, $e^6$, is inserted in one of the bevel-wheels D³, which, as the wheel rotates, pushes up the outer end of the catch or latch and draws the inner end down out of engagement with the collar $e^5$. During the forward movement of the spindle B the gear-wheel and ratchet-wheel or flange $d^5$ $d^6$ must of course rotate in a direction the reverse of that imparted to them by the pawl $d^8$, as above described, and hence the pawl must be out of engagement with the ratchet-teeth or the machine would be broken. To raise the pawl, I employ a trip-rod, F, adapted to slide in bearings $f$, and connected positively with the spindle B by the arm $e'$, and moved back and forward by the spindle. Upon the rod F are secured tappets $f'$ $f^2$, the first of which strikes against the pawl $d^8$ and raises it out of engagement with the ratchet-teeth, as seen in Fig. 2, when the spindle B is moved back, and the latter, $f^2$, of which strikes against the opposite side of the pawl and throws it into engagement with the ratchet-teeth when the spindle is moved forward. Thus it will be seen that by each forward movement of the spindle the pawl is thrown into gear, so that it may by its movement impart the backward movement to the spindle. The pawl $d^8$ may be secured to its operating-lever $d^7$, so that when moved by the tappets $f'$ $f^2$ in either direction it will be held by friction; or its hub may contain a spring which presses against said lever, and thus holds the pawl in either position in which it is placed. Upon the rod F is a stop-collar, $f^3$, by which the forward movement of the rod and spindle B may be limited.

I will now describe the clamping or holding jaws and the mechanism for operating them. (Best shown in Figs. 3, 2, and 1.)

G G designate a pair of jaws, pivoted at $g$, and adapted to vibrate in a vertical plane. At their upper ends said jaws are notched at $g'$ opposite the center of the spindle B, to hold a bolt concentrically to the center of the die-head C, and when not forced together to hold a bolt said jaws are opened by a spring, $g^2$, which draws together their lower ends, as seen in Fig. 3. The jaws G are forced together by means of a wedge, $g^3$, which is carried by a bent lever, G', that is fulcrumed at $g^4$, and the lever is raised to force the wedge between the jaws by a cam, G², and is drawn down to withdraw the wedge and allow the jaws to open by means of a spring, $g^5$. The cam G², which operates the lever G', is mounted on a cam-shaft, H, adapted to rotate in bearings $h$, and arranged in line with the continuously-rotating shaft D. Upon the adjacent ends of the shafts H and D are the two parts $h'$ $h^2$ of an ordinary toothed clutch, each of which is secured to its shaft by means of a feather, so that it may move longitudinally thereon. The shaft H is hollow for a portion of its length, and contains a central sliding rod, $h^3$, and upon the outside of the shaft is fitted a sliding sleeve, $h^4$, which has a roller, $h^5$, that engages with an internally-grooved cam, H', which is clearly shown in Figs. 1, 2, 6, and 7. The part $h'$ of the clutch and the sleeve $h^4$ are both secured by pins $h^6$ to the sliding rod $h^3$, and hence it will be seen that the cam H', in moving the said sleeve, also moves the part $h'$ of the clutch toward and from the other part, $h^2$. The part $h^2$ of the clutch is impelled toward the part $h'$ by means of a spiral spring, $h^7$, in the shaft D; but the part $h^2$ is held against the force of said spring by means of a pivoted catch, $i$, which engages with an upward projection, $i'$, on the part $h^2$ of the clutch, as seen most clearly in Fig. 2.

I designates a lever, which is pivoted at $i^2$, and one end of which is bifurcated, so as to engage with a flange or collar, $i^3$, on the spindle B, while the outer end has in it an arc-shaped slot or slideway, $i^4$, in which is adjustably secured a stud, $i^5$, as best seen in Figs. 1 and 2, but also in Fig. 4. In the stud $i^5$ is pivoted a latch, $i^6$, which projects in the way of a shoulder on the top of the catch $i$, and as the lever I is vibrated by the movement of the spindle B the forward movement of the spindle will cause the latch $i^6$ to tilt on its pivot and pass over the shoulder on the catch $i$; but the backward movement of the spindle will cause the latch $i^6$ to trip the catch $i$ and release the part $h^2$ of the aforesaid clutch.

The operation of these parts is as follows: While the spindle is in its backward position, the shafts H and D being connected by the clutch $h'$ $h^2$, the former shaft is rotated to cause the clamping-jaws to grasp a bolt; but during such rotation the cam H' forces the sleeve $h^4$, rod $h^3$, and the part $h'$ of the clutch toward the part $h^2$ of the clutch and moves the latter part back upon its shaft until the catch $i$ catches onto the projection $i'$ of the part $h^2$ of the clutch. The part $h^2$ is thus held against longitudinal movement on its shaft, while the continued rotation of the shafts H and D carries the part $h'$ of the clutch away from the part $h^2$ and disconnects the shafts H and D, leaving the former shaft stationary, while the latter continues to rotate. When the spindle moves forward the lever I carries the latch $i^6$ over the catch $i$ without tripping the latter, and hence the shaft H is stationary during the whole threading operation; but as soon as the spindle commences its backward movement, and it is no longer necessary to hold the bolt, the latch $i^6$ trips the catch $i$, releasing the part $h^2$ of the clutch and allowing the spring $h^7$ to throw the said part into engagement with the part $h'$, whereby the two shafts H and D are again connected and the clamping-jaws are opened to release the threaded bolt and closed to grasp a bolt-blank. From the above description it will be understood that the shaft H is rotated intermittingly, and is stopped in position to hold the clamping-jaws upon the bolt-blank, and is started forward from this positive starting-point at each backward movement of the spindle. By this arrangement all liability of the blank being released before the die completes the thread is obviated and the disarrangement and breakage of the parts of the machine are prevented.

J designates a hopper, into which the bolt-blanks are placed, and which is continuously rotated by means of bevel-wheels J', to which motion is transmitted by a belt, J$^2$, from a pulley, J$^3$, on the shaft D, and a pulley, J$^4$, on the hopper-shaft J$^5$, as clearly seen in Fig. 2.

K designates tracks or ways, which are supported on a standard, K', and between which the bolt-blanks are allowed to gravitate downward.

L designates a fork, pivoted at $j$, and adapted to be turned down into the hopper J, so that it will catch the bolt-blanks by the heads as the hopper turns, and to be raised into the position shown in Fig. 2, so that the blanks slide down the fork into the tracks or ways K. The desired motion is imparted to the fork L by means of a vertically-moving spindle or rod, L', extending through the center of the hopper J, and raised by means of a cam, J$^6$, upon the shaft J$^5$.

On the rod L' is an arm, L$^2$, which has a slotted connection with an arm or crank, L$^3$, on the pivot $j$ of the fork L, and by the rising and falling of the rod L' the fork is vibrated. The lower ends of the tracks or ways K are covered by a curved guard, $k$, which is secured on a shaft, $k'$, and has in it a notch or depression, $k^2$, (see Fig. 3,) which is adapted to receive a single bolt-blank. The shaft $k'$ is oscillated to move the guard $k$ by means of a rod, $k^3$, which connects an arm, $k^4$, on the shaft $k'$ with an arm, $k^5$, on a tubular rock-shaft, $k^6$. The rock-shaft $k^6$ is oscillated by means of a rod, $k^7$, which forms a connection between an arm, $k^8$, on said shaft and a pivoted lever, M, which is operated by a cam, M', on the cam-shaft H, as seen in Figs. 1 and 3. When the guard $k$ is in the position shown in Fig. 3 a bolt-blank rests in the depression or notch $k^2$ therein, and when the guard is moved outward the said blank is carried with it, while the curved part of the guard covers the tracks or ways and prevents the bolt-blanks from falling out. The single blank which is carried out from the tracks or ways is taken by a vibrating feeder or feeding device, N, and inserted between the clamping-jaws G G. The feeder N is fixed upon a rock-shaft, $l$, which is within the tubular rock-shaft $k^6$, and which has an arm, $l'$, through which it is oscillated by means of a rod, $l^2$, and a pivoted lever, O, operated by a cam, O', on the shaft H.

Inasmuch as the guard and carrier k and feeder N are well-known in screw and other machines, I do not claim them, broadly, but only when they derive motion from the intermittingly-rotated shaft H. This manner of operating them is very advantageous, inasmuch as they are perfectly timed with the clamping-jaws and cannot present a blank when the jaws are not ready to receive it, as they might do if they were operated at regular predetermined intervals in the usual way.

By my invention I provide a machine which will be entirely automatic in its operation so long as a supply of bolt-blanks is kept in the hopper, and I thereby dispense with an attendant for each machine and enable one man to attend to a number of machines.

What I claim as my invention, and desire to secure by Letters Patent, is—

1. In a bolt-threading machine, the combination of the die-carrying spindle B, adapted to rotate continuously in one direction, and having a quick backward movement, the sectional die C, means for opening said die, the clamping or holding jaws G, the intermittingly-rotating cam-shaft H for operating said jaws, the continuously-rotating shaft D, and a clutch or device which is adapted to be operated by the backward movement of the spindle to connect said shafts, substantially as herein specified.

2. In a bolt-threading machine, the combination of the die-carrying spindle B, adapted to rotate continuously in one direction, and having a quick backward movement, the sectional die C, means for opening said die, the clamping or holding jaws G and feeder N, the intermittingly-rotating cam-shaft H for operating said jaws and feeder, the continuously-rotating shaft D, and a clutch or device which is adapted to be operated by the backward movement of the spindle to connect said shafts, substantially as herein specified.

3. The combination of the spindle B, the clamping or holding jaws G, the cam-shaft H and the shaft D, the clutch portions $h'$ $h^2$, fitted one upon each shaft and longitudinally movable, the cam H', the catch $i$, and mechanism for tripping said catch, capable of being operated by the backward movement of the spindle, substantially as specified.

4. In a bolt-threading machine, the combination of a die-carrying spindle, mechanism for imparting a backward movement thereto, a spring for imparting a forward movement to said spindle, and a catch for holding said spindle in its backward position against the force of said spring until released by the machine, substantially as specified.

HENRY C. BRILL.

Witnesses:
JOHN C. LEWIS,
MARCUS H. HOLCOMB.